July 2, 1929.  M. H. HANSEN  1,719,510
NURSERY SCALE BASE
Filed March 26, 1926

Inventor:
Marius H. Hansen,
By Glindell Power o Carlson
attys.

Patented July 2, 1929.

1,719,510

UNITED STATES PATENT OFFICE.

MARIUS H. HANSEN, OF CHICAGO, ILLINOIS, ASSIGNOR TO HANSON SCALE COMPANY, OF CHICAGO, ILLINOIS, A CORPORATION OF ILLINOIS.

NURSERY-SCALE BASE.

Application filed March 26, 1926. Serial No. 97,527.

This invention relates to a base for a scale and more particularly to a detachable supporting base for a nursery scale of a type similar to that covered by Patent No. 1,275,911 issued to me on August 13, 1918.

It has been found that, in the type of nursery scales to which this application particularly relates, there is a serious objection due to the tendency of this scale to become top-heavy and tip over when an infant is being weighed.

In order to overcome such a tendency to tip, it is necessary to give greater area to the base of the scale and also to increase the weight of the lower portion of the scale. It is possible to make a scale base having these requirements, which is integral with the frame or casing of the scale. But in a scale of this type, that is, one which has a removable hammock, it is entirely feasible to remove the hammock and use the scale for other weighing purposes. In such a case, the scale would become unwieldy, cumbersome and awkward, would occupy too much space, and, in general, would not be suitable unless it were possible to remove the over-size base at the same time.

An essential object of this invention is to provide a base for a nursery scale which will impart sufficient stability to the scale so that there will be practically no danger that the scale will overturn if the baby squirms about in the hammock.

Another object is to provide a base which is capable of being easily attached to or detached from the scale.

In the following description and accompanying drawings, I have shown a preferred embodiment of my invention, but the full scope of my invention will be indicated in the appended claims.

In the drawings, Figure 1 is a front view of a nursery scale embodying the invention.

Figure 4:
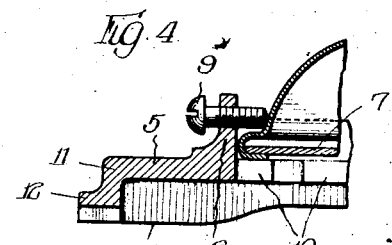
Fig. 4 is an enlarged sectional view of one of the fastening means shown in Fig. 3.

In its preferred form my scale base is formed from an integral iron casting. By so doing, it is possible to make, economically and efficiently, a base having sufficient weight to stabilize the scale. A base made from stamped metal would either lack the necessary weight and rigidity or would have to be so broad as to be cumbersome. Referring particularly to the drawings my base comprises a flat base 5 defining an opening 6 which has substantially the same dimensions as has the bottom or base of a scale 7 to which the base is to be attached. An upstanding wall 8 around the inner periphery of the plate 5 serves to hold the scale 7 in position and prevent lateral displacement thereof. Threaded into the peripheral wall 8 are a number of screws 9 adapted to be screwed against the base of the scale 7 as shown in Fig. 4 and thus rigidly fasten the base and the scale together. The scale is prevented from slipping through the opening 6 by a plurality of lugs 10 projecting inwardly from the peripheral wall 8 in the plane of the plate 5 and which serve as a rest for the bottom of the scale 7.

Figure 1:
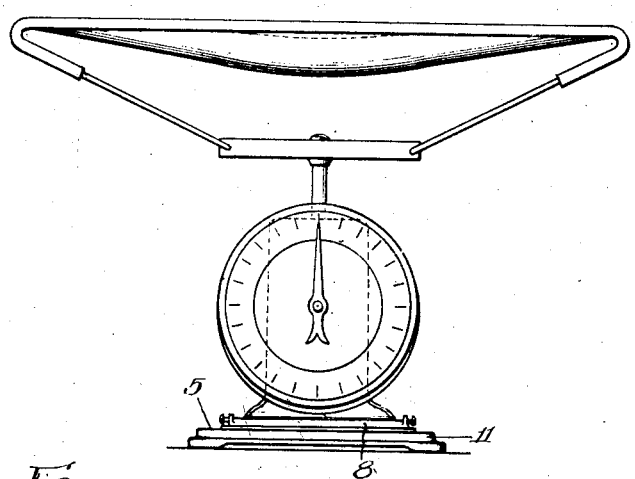
Figure 2:
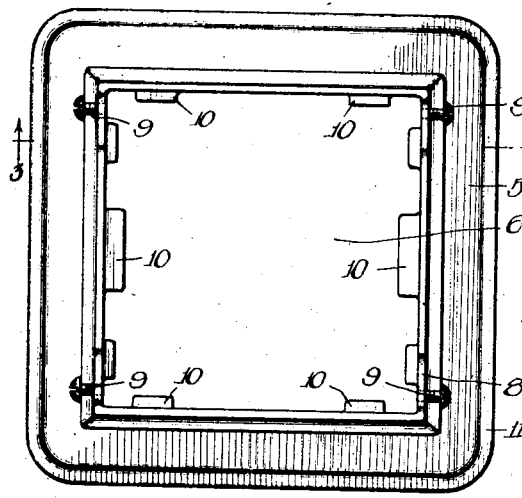
Fig. 2 is a plan view of the base.
Figure 3:
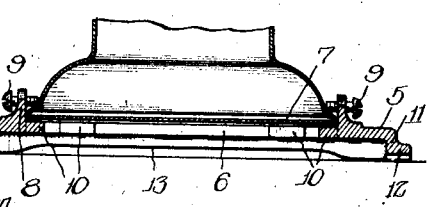
Fig. 3 is a cross sectional view of the base taken on a line 3—3 of Fig. 2.

Around the outer periphery of the plate 5 is a downwardly projecting flange 11 having its lower portion flared outwardly as at 12 Fig. 4. The flange 11 is recessed between the corners as at 13 Fig. 3 leaving short rests or supports 14 at the corners of the plate.

When the scale is not being used to weigh a child, the auxiliary base may be detached, thus making the scale lighter to handle, and requiring less shelf space.

I claim as my invention:

1. In a detachable scale base, a combination, comprising a flat plate having a central opening, an internal upstanding wall integral therewith and defining said opening, fastening means in said wall, scale supporting means projecting inwardly from said wall, said plate having a downwardly projecting flange on the external periphery thereof, portions of said flange being recessed to provide short legs for said base.

2. A detachable base for a scale comprising, in combination, a flat base having a central aperture of substantially the same size and contour as the lower portion of a scale to be supported, an upstanding peripheral wall about said aperture arranged to encircle the lower portion of said scale, a plurality of flanges projecting inwardly of said opening for supporting said scale therein, and means mounted in said wall for detachably securing said scale to said base.

In testimony whereof, I have hereunto affixed my signature.

MARIUS H. HANSEN.